(12) United States Patent
Lee et al.

(10) Patent No.: US 12,157,805 B2
(45) Date of Patent: Dec. 3, 2024

(54) FIRE SEALS AND METHODS OF MAKING SAME

(71) Applicant: MEGGITT AEROSPACE LIMITED, Coventry (GB)

(72) Inventors: Stuart Hastings Lee, Leicestershire (GB); Toby George Henry Reid, Derbyshire (GB); Steve Fackler, McMinnville, OR (US)

(73) Assignee: MEGGITT AEROSPACE LIMITED, Coventry (GB)

( * ) Notice: Subject to any disclaimer, the term of this patent is extended or adjusted under 35 U.S.C. 154(b) by 224 days.

(21) Appl. No.: 17/588,036

(22) Filed: Jan. 28, 2022

(65) Prior Publication Data

US 2023/0242740 A1    Aug. 3, 2023

(51) Int. Cl.

| *C08K 13/04* | (2006.01) |
| *C08L 83/04* | (2006.01) |
| *C09K 3/10* | (2006.01) |
| C08K 3/22 | (2006.01) |
| C08K 3/36 | (2006.01) |
| C08K 3/40 | (2006.01) |
| C08K 7/06 | (2006.01) |
| C08K 7/14 | (2006.01) |

(52) U.S. Cl.
CPC ............ *C08K 13/04* (2013.01); *C08L 83/04* (2013.01); *C09K 3/1018* (2013.01); *C08K 2003/2265* (2013.01); *C08K 3/36* (2013.01); *C08K 3/40* (2013.01); *C08K 7/06* (2013.01); *C08K 7/14* (2013.01); *C08K 2201/014* (2013.01); *C08L 2201/02* (2013.01); *C08L 2205/16* (2013.01); *C09K 2003/1078* (2013.01); *C09K 2200/0685* (2013.01); *C09K 2200/0695* (2013.01)

(58) Field of Classification Search
CPC ............ C08K 13/04; C09K 3/10; C08L 83/04
USPC ........................................................ 523/179
See application file for complete search history.

(56) References Cited

FOREIGN PATENT DOCUMENTS

| CN | 101565625 B | 7/2012 | |
| CN | 103571114 A | 2/2014 | |
| CN | 106633541 A | 5/2017 | |
| CN | 110982185 A * | 4/2020 | ............ C08K 13/04 |
| CN | 109467878 B | 5/2021 | |
| EP | 1482228 A1 | 12/2004 | |
| KR | 101896898 B1 | 9/2018 | |

* cited by examiner

*Primary Examiner* — Deve V Hall
(74) *Attorney, Agent, or Firm* — ORBIT IP, LLP (57) ABSTRACT

Rubber compounds with increased resistance to fire are disclosed. The rubber compounds are incorporated into fire seals and in particular into fire seals for aerospace applications. The advance rubber compounds are created by adding a powdered vitreous or glass material in combination with a fiber such as carbon fiber, with or without intumescent material to a base rubber compound and then curing.

22 Claims, 8 Drawing Sheets

FIRE SEALS AND METHODS OF MAKING SAME

FIELD

The present patent document relates to improved fire seals and methods of making improved fire seals. In particular, the present patent document relates to improved fire seals for use in aviation and more particularly aircraft.

BACKGROUND

Rubber fire seals serve multiple purposes: To contain a mixture of fuel, air, oil, or other chemicals. Provide a flexible surface to seal gaps, bridge joints, create flexible bellows and pipe fittings or as metal to metal, composite to composite or composite to metal interface materials. They are also safety critical devices, which must isolate fire, prevent it spreading, providing time for fire suppression and the safe shutdown and feathering of the powerplant.

Flexible, elastomeric fireproof seals providing resistance to flame penetration between an aircraft structure and the engine fire zones are required for most aircraft. A fireproof seal must prevent the penetration of an 1100° C. flame for 15 minutes, whereas a fire-resistant seal must prevent the penetration of an 1100° C. flame for 5 minutes.

Fire seals are usually made from combinations of various elastomers and fabrics. These include silicone, fluorosilicone and other elastomers, reinforced with ceramic (extremely expensive), polyamide, or glass fabrics. The production process is skilled and labor intensive and therefore, particularly costly.

SUMMARY OF THE EMBODIMENTS

Object of the present patent document is to provide an improved fire seal that exhibits equal or better performance than a conventional fire seal. This invention seeks to partially or fully eliminate the use of expensive ceramic-based fabrics and at the same time reduce the skilled labor required to manufacture fire seals.

In one aspect of the present patent document, an improved fire seal is provided. In preferred embodiments, the fire seal is cured from a fire seal mixture that comprises a base rubber compound comprising a silicone or fluorosilicone polymer that is between 50% and 95% of a total mass of the fire seal mixture. In addition to the base rubber compound, the fire seal mixture comprises an additive that is a vitreous material between 2.5% and 50% of the total mass of the fire seal mixture or an intumescent material that is between 5% and 50% of the total mass of the fire seal mixture. The fire seal mixture also includes short fiber strands that are between 1% and 25% of the total mass of the fire seal mixture.

In preferred embodiments, the short fiber strands are selected from the group consisting of short-cut carbon fibers, para-aramid, meta-aramid and basalt. In some embodiments, the short fiber strands have a tensile strength of between 2000 and 5300 MPa. In some embodiments, the short fiber strands have a tensile modulus of between 300 and 350 GPa. Preferably, the short fiber strands have a length between 0.5 mm and 10.0 mm.

In some embodiments, the vitreous material is enamel and in other embodiments the vitreous material may be glass or pure glass. Preferably, the vitreous material is added to the fire seal mixture as a powder.

In another aspect of the present patent document, a method of making a fire seal from a fire seal mixture is provided. In preferred embodiments, the method comprises: adding a base rubber compound consisting of silicone or fluorosilicone polymer to the fire seal mixture such that the base rubber compound is between 50% and 95% of a total mass of the fire seal mixture; adding an additive to the fire seal mixture wherein the additive is a vitreous material that is between 2.5% and 50% of the total mass of the fire seal mixture or an intumescent material that is between 5% and 50% of the total mass of the fire seal mixture; adding short fiber strands to the fire seal mixture that are between 1% and 25% of the total mass of the fire seal mixture; and to create a second compound; and curing the fire seal mixture into the fire seal.

DETAILED DESCRIPTION OF THE DRAWINGS

Improved fire seals and methods of making improved fire seals are disclosed herein. The fire seals are improved through various different techniques which may be deployed independently or in conjunction with each other. One aspect of the improvement is the use of novel intumescent or fireproof materials. Another aspect of the invention is the mixing of short fiber reinforcement into the rubber. The use of short fiber reinforcement reduces the number of fabric plies required and works synergistically with fireproof materials to improve fire test performance. Short fiber reinforcement may also reduce part cost and provide a lower risk of failure due to delamination, wrinkles or tearing of the fabric.

In some embodiments, the addition of vitreous materials to provide a fire proof barrier is also used. In some embodiments, the vitreous material is an enamel. In other embodiments, the vitreous material is glass or pure glass. In some embodiments, the additive materials may be processed by making use of either liquid silicone rubber (LSR) or high consistency rubber (HCR).

The novel materials incorporated into the fire seals to improve their performance may be: 1.) Vitreous enamel or other glass in powdered form, 2.) High strength fibers and preferably short-cut carbon fibers; and/or 3) Intumescent expanded graphite. It should be appreciated that these materials may be used alone or in any combination and quantity depending on the embodiment. In some embodiments, only a subset of these materials may be used. For example, in preferred embodiments, powdered vitreous enamel or glass is used in combination with short-cut carbon fibers. In other embodiments, intumescent expanded graphite is used in combination with short-cut carbon fibers. In other embodiments, other combinations may be used.

By "incorporated" it is meant that the novel materials are added into the rubber and cured along with the rubber. For clarity, the novel materials are not cured only the rubber is cured but the added materials are present during the curing of the rubber. These novel materials may be added in various quantities and those will be discussed in depth below.

The powdered vitreous material or other glass powder is mixed with the liquid or high consistency rubber and then formed into the shape of a seal and allowed to cure. Once heated in a fire situation, the powdered vitreous material or other glass powder melts under moderate heat and then fuses together at a higher temperature to form a fire-proof barrier.

In preferred embodiments, high strength fibers may also be added to the rubber compound prior to curing. In preferred embodiments, the high strength fibers may be short-cut carbon fibers. The fibers are added when the compound is in liquid or paste form and then formed into the shape of a seal and allowed to cure. In preferred embodiments, the fibers are made from an organic material but in some embodiments, the fibers may be made from an inorganic material. High strength organic fibers such as short-cut carbon fibers improve the mechanical properties of the rubber and also aid in the fire test performance.

In preferred embodiments, fibers with a tensile strength of between 2000 and 5300 MPa are used. In addition, the fibers preferably have a tensile modulus of between 300 and 350 GPa. Examples of such fibers may include but are not limited to: short-cut carbon fibers, para-aramid, meta-aramid and basalt. These types of fibers provide good dispersion in high consistency rubber with standard two roll milling or by other standard industrial methods for mixing in liquid rubber. In addition, the fibers may be bought as either recycled with original sizing, recycled with sizing removed, pyrolyzed or virgin material.

Short fibers in the range of 0.5 mm to 10.0 mm long may be used in the preferred embodiments. In some embodiments, the fibers are 6 mm+1 mm long when added to the mixture. However, the fibers may break down to shorter lengths when mixed in with the rubber. The quantity of short fibers added to the rubber may be varied according to the balance of properties required in the produced seal but is in the range of 1% to 25% by weight. For example, the addition of 10% often gives a good balance between post-fire consolidation and mechanical properties of the rubber.

In some embodiments, intumescent expanded graphite can also be used. In a similar manner to the other materials, intumescent expanded graphite is added prior to forming and curing the rubber. Intumescent expanded graphite increases fire resistance of the rubber by expanding when heated to form an insulative carbon layer. Between 5 and 50% by weight of intumescent expanded graphite may be used depending upon type used, rubber compound that it is added to and end use of the produced seals.

In addition to the new materials being added, the embodiments herein may be devoid of fabric reinforcement used as a fire barrier that is found in traditional fire seals. In many traditional fire seal constructions, two or even three layers of fabric reinforcement are required for the rubber seals to pass fire testing. In contrast, in the embodiments herein, no fabric is necessary. Instead, the vitreous or glass layer or expanded graphite layer provides a protective barrier from the flame while the carbon fiber reinforcement helps to stabilize the rubber and prevent warping and tearing. Although fabric is not required in the embodiments herein, fabric may still be added to provide stiffness or for any other reason without departing from the scope of the embodiments described herein.

The embodiments herein use additives in the creation of rubber to create a compound that has enhanced heat resistance properties and can be used for the formation of fire seals. As used in this patent document, the term "rubber" means thermoset or thermoplastic, polymeric elastomer substances. In preferred embodiments, rubbers already used for the making of fire resistant seals may be used and the additives taught herein added to these existing rubber compounds prior to forming and curing. Examples of existing rubber compounds that may be used are: Liquid and high consistency silicone and fluorosilicone polymers, reinforced with silica and/or other commonly used reinforcing or extending fillers and cross-linked using peroxide, platinum or tin-based curing systems.

The vitreous material or other glass is preferable in a powdered form, however, in some embodiments, spherical powder may also be used. The preferred particle size is between 200 and 400 mesh (0.074 and 0.037 mm). The table below provides two different possible embodiments and shows characteristics of a fire suppression compound made with an intumescent material and a vitreous or other glass material. The table below is just two possible embodiments and many others are possible without departing from the scope of this patent document.

| Characteristics | Intumescent Material | Vitreous or Other Glass Material |
| --- | --- | --- |
| Character Structure | Softer, only forms on the exposed surfaces. | Hard and brittle |
| Rubber after the first test | Maintains reasonable toughness and strength | Tends to induce brittleness when used alone |
| Curing | Can cure with most rubbers | Cures with all rubbers |
| Operating Temperature | 250° C.-300° C. | Around 400° C. |
| Reinforcement | Little effect on reinforcement of rubber | Lowers tensile strength, elongation at break and tear strength |
| Surface Finish | Slight expansion during post cure gives a rougher surface texture | No effect on overall surface texture, may contain loose grains of glassy powder |

| Characteristics | Intumescent Material | Vitreous or Other Glass Material |
|---|---|---|
| Wear resistance | Surface flakes can be abraded away, may be a slight lubricant | May increase the wear of surrounding materials due to abrasion from glassy powder |
| Sustainability | Comes from a natural product before being processed in acid and washed with water (waste water has to be neutralized) | Recycled grade is a by-product of a large stable industry. Virgin grade comes from combination of naturally occurring products. |

When creating the high consistency rubber compound, mixing may be conducted on a two-roll mill with contra-rotating rollers. In preferred embodiments, the temperature of the rubber is maintained at room temperature. The rubber may be sheeted off and laid up into a mold directly or transferred onto a calendar for further processing. When creating the liquid silicone rubber compound, it may be mixed by any conventional method; stirring, Z-blade mixer etc.

In one embodiment, the following manufacturing process was used to make an improved fire seal compound:
1. Source 200 g of high consistency rubber masterbatch
2. Using a 300 mm wide, two-roll, mixing mill set (Preferred nip setting 2 to 3 mm, gate width approximately 90 mm)
3. Mix in fiber reinforcement ensuring good dispersion, minimum mixing time: 5 minutes, cutting and folding the mixture as required
4. Mix in fireproof/intumescent materials, cutting and folding until well dispersed
5. Reduce nip setting to 1.5 to 2.5 mm or as required by following processes, set gates to maximum width
6. Sheet rubber off and perform required fabrication processes to produce the required seals or other products
7. Cure for specified time (dependent on peroxide used)

After curing the products are transferred to a hot air oven and post cured to remove volatiles, this process is key as it prevents property drop off when the rubber goes into service. Typical temperatures and times used for cure and post cure are shown in the (table 1). As one skilled in the art will appreciate, these are just examples and cure and post cure times and temperatures can vary greatly depending on the desired final product.

| Rubber | Peroxide Name | Cure | Post cure |
|---|---|---|---|
| High consistency silicone-based rubber compound, containing red iron oxide and silica fillers | Dicumyl peroxide | 10 mins @ 150° C. | 24 hrs @ 200° C. |
| High consistency silicone-based rubber compound, containing red iron oxide and silica fillers | Di(2,4-dichloro benzoyl)peroxide | 7 mins @ 110° C. | 24 hrs @ 200° C. |
| High consistency silicone-based rubber compound, containing iron oxide and silica fillers | 2,5-dimethyl-2,5-di(tert-butylperoxy) | 10 mins @ 165° C. | 16 hrs @ 150° C. |

FIG. 1 illustrates layup options for an omega type fire seal. FIG. 1A illustrates a fire seal with an omega shaped cross-section made using conventional materials. FIGS. 1B, 1C and 1D show various improved fire seal layups. In FIG. 1B, the typical woven ceramic fabric layer has been replaced with calendered sheet of improved rubber using additives as taught herein. FIG. 1C illustrates an embodiment with all the traditional rubber replaced with improved rubber as taught herein. FIG. 1D illustrates an embodiment where all the traditional rubber has been replaced with improved rubber as taught herein and an additional sheet of woven glass fabric ply is used to replace the woven ceramic fabric.

Figure 1A:
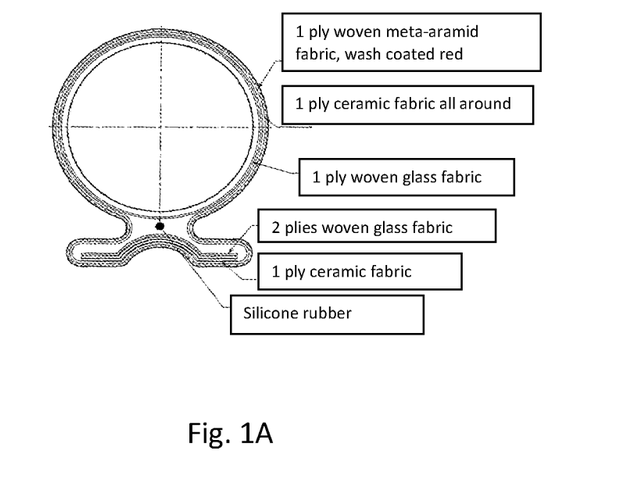
FIG. 1A illustrates a fire seal with an omega shaped cross-section made using conventional materials.
Figure 1B:
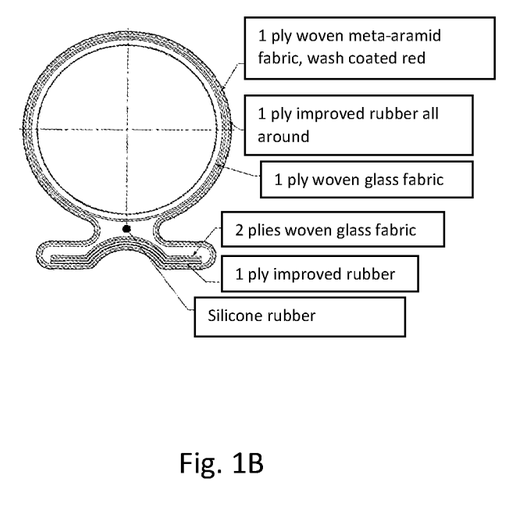
FIG. 1B illustrates a fire seal where the typical ceramic fabric layer has been replaced with calendered sheet of improved rubber using additives as taught herein.
Figure 1C:
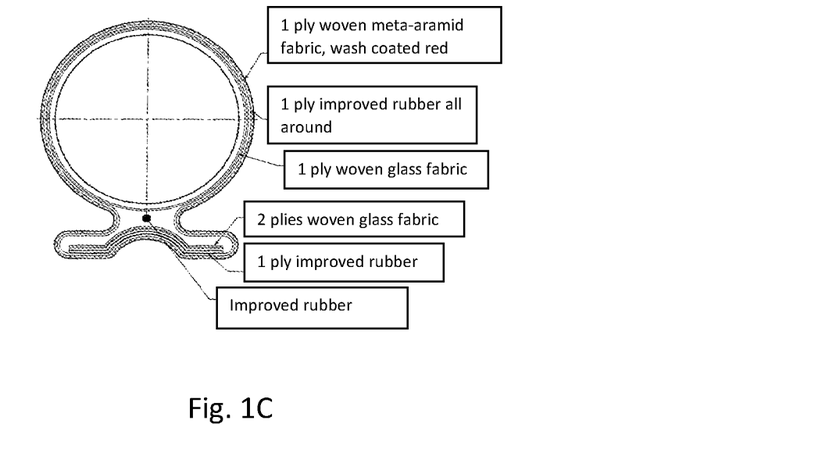
FIG. 1C illustrates an embodiment with all the traditional rubber replaced with improved rubber as taught herein.
Figure 1D:
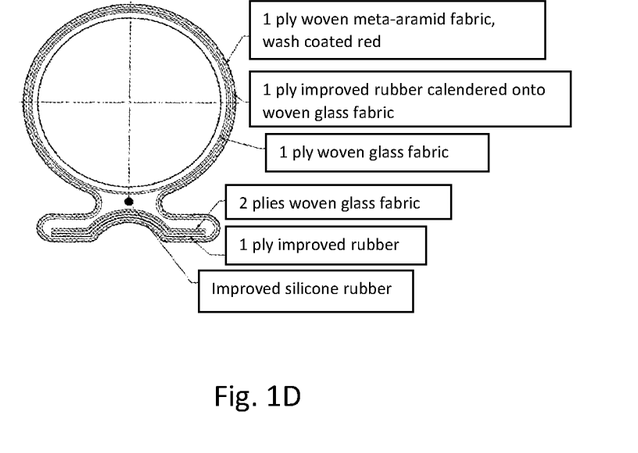
FIG. 1D illustrates an embodiment where all the traditional rubber has been replaced with improved rubber as taught herein and an additional sheet of glass fabric is used to replace the ceramic fabric.
Figure 2:
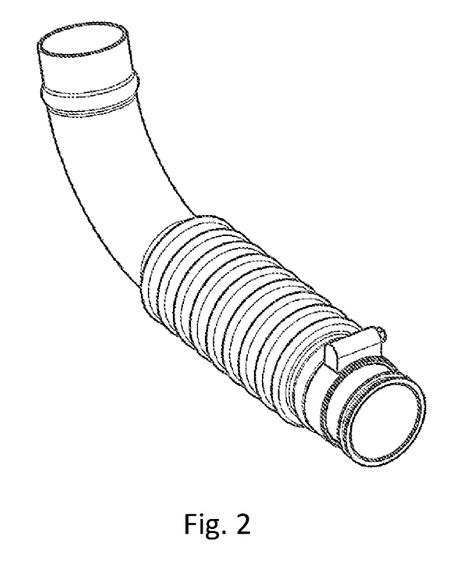
FIG. 2 illustrates an isometric view of a typical bellow.
Figure 3A:
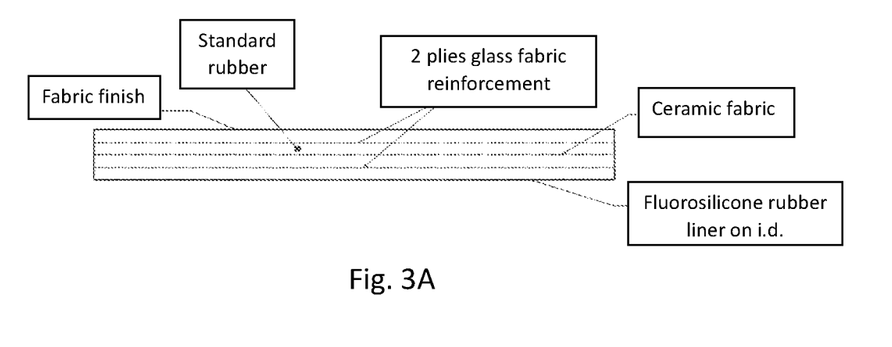
FIG. 3A illustrates a cross-sectional view of the layers in a conventional bellow construction.
Figure 3B:
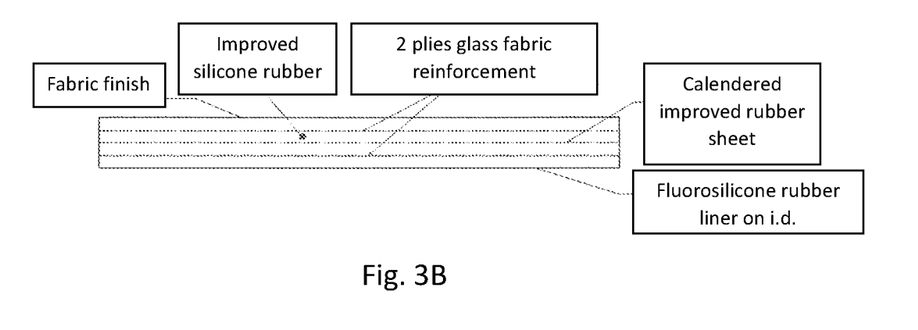
FIG. 3B illustrates a cross-sectional view of the layers in one embodiment of a bellow wherein all the conventional silicone rubber was replaced with the improved rubber taught herein and the layer of ceramic fabric was replaced with a calendered improved rubber sheet made according to the methods taught herein.
Figure 3C:
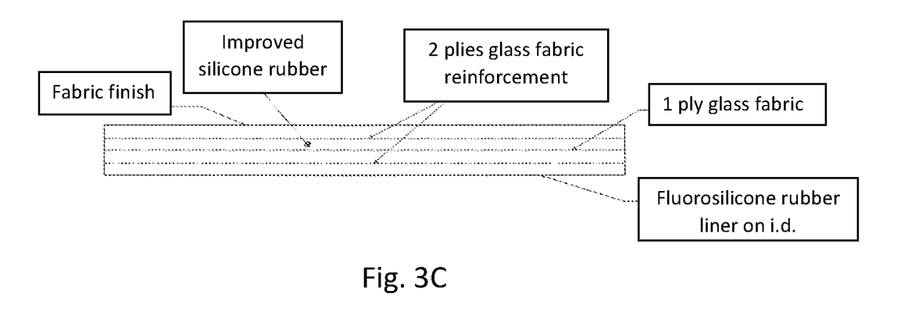
FIG. 3C illustrates a cross-sectional view of the layers of another embodiment of a bellow wherein all the conventional silicone rubber was replaced with the improved rubber taught herein and the ceramic fabric sheet was replaced with an extra woven glass fabric ply.

FIG. 2 illustrates an isometric view of a typical bellow. FIGS. 3A-3C illustrate a cross-section view of the layers in different possible bellow constructions. FIG. 3A illustrates a cross-sectional view of the layers in a conventional bellow construction.

FIG. 3B illustrates a cross-sectional view of the layers in one embodiment of a bellow wherein all the conventional silicone rubber was replaced with the improved rubber taught herein and the layer of ceramic fabric was replaced with a calendered improved rubber sheet made according to the methods taught herein. In the embodiment shown in FIG. 3B, all the conventional rubber was replaced with the improved rubber taught herein and the layer of woven ceramic fabric was replaced with a calendared improved rubber sheet made accordingly to the methods taught herein. In the embodiment shown in FIG. 3B, the fluorosilicone used as an oil resistant lining is retained.

FIG. 3C illustrates a cross-sectional view of the layers of another embodiment of a bellow wherein all the conventional silicone rubber was replaced with the improved rubber taught herein and the ceramic fabric sheet was replaced with an extra woven glass fabric ply. In the embodiment shown in FIG. 3C all the conventional rubber was replaced with the improved rubber taught herein and the woven ceramic fabric sheet was replaced with an extra woven glass fabric ply. In the embodiment shown in FIG. 3C, the fluorosilicone used as an oil resistant lining is retained.

Table 2 below lists a number of potential layering options for fire seals made with the improved rubbers taught herein:

TABLE 2

| Identification | Layup |
|---|---|
| Improved 1 | Silicone rubber sheet with short fiber, Woven glass fabric, Silicone rubber sheet with short fiber, Meta-aramid fabric |
| Improved 2 | Silicone rubber sheet with short fiber, Silicone rubber sheet with short fiber, Silicone rubber sheet with short fiber, Meta-aramid fabric |

TABLE 2-continued

| Identification | Layup |
| --- | --- |
| Improved 3 | Silicone rubber sheet with short fiber, Silicone rubber sheet with short fiber, Silicone rubber sheet with short fiber, Silicone rubber sheet with short fiber, Silicone rubber sheet with short fiber |
| Improved 4 | Silicone rubber sheet with short fiber, Woven glass fabric, Woven glass fabric, Meta-aramid fabric |
| Improved 5 | Silicone rubber sheet with short fiber, Silicone rubber sheet with short fiber, Woven glass fabric, Woven glass fabric, Woven glass fabric |
| Improved 6 | Woven glass fabric, Woven glass fabric, Woven glass fabric, Meta-aramid fabric |
| Improved 7 | Silicone rubber sheet with short fiber, Woven glass fabric, Woven glass fabric, Woven glass fabric, Woven glass fabric |

Table 3 below lists potential ranges of additives for the embodiments of fire-retardant fire seals taught herein. In different embodiments, additives may be used alone or in combination and in various different ranges. Each range shown below includes all the possible ranges within it.

| Additive | Percentage loading |
| --- | --- |
| Vitreous enamel or glass | 2.5 to 50% |
| Intumescent material | 5 to 50% |
| Short Fiber | 1 to 25% |

Once the fire seal mixture is sufficiently mixed, the mixture is cured into a fire seal. Curing conditions for production fire seals will depend upon the actual size of the parts and tooling to be used. Curing time depends on temperature, thickness of the rubber and total mass. As an example, cure times can range from between 7 minutes for an HCR test sheet to 24 hours for a room temperature cured LSR. As for temperature, a wide range may be used as well. LSR will cure at room temperature whereas some peroxide cured HCR's require 170° C. or more.

What is claimed is:

1. A fire seal cured from a fire seal mixture comprising:
   a base rubber compound comprising a silicone or fluorosilicone polymer that is between 50% and 95% of a total mass of the fire seal mixture;
   an additive that is a vitreous material that is between 2.5% and 50% of the total mass of the fire seal mixture or an intumescent material that is between 5% and 50% of the total mass of the fire seal mixture; and
   short fiber strands that are between 1% and 25% of the total mass of the fire seal mixture.

2. The fire seal of claim 1, wherein the short fiber strands are selected from the group consisting of short-cut carbon fibers, para-aramid, meta-aramid and basalt.

3. The fire seal of claim 1, wherein the short fiber strands are short-cut carbon fibers.

4. The fires seal of claim 1, wherein the additive is the vitreous material.

5. The fire seal of claim 4, wherein the vitreous material is enamel.

6. The fire seal of claim 4, wherein the vitreous material is added to the fire seal mixture as a powder.

7. The fire seal of claim 4, wherein the vitreous material is glass.

8. The fire seal of claim 1, wherein the short fiber strands have a tensile strength of between 2000 and 5300 MPa.

9. The fire seal of claim 8, wherein the short fiber strands have a tensile modulus of between 300 and 350 GPa.

10. The fire seal of claim 1, wherein the short fiber strands have a length between 0.5 mm and 10.0 mm.

11. The fire seal of claim 1 wherein the additive is an intumescent material that is between 5% and 50% of the total mass of the fire seal mixture.

12. A method of making a fire seal from a fire seal mixture comprising:
    adding a base rubber compound consisting of silicone or fluorosilicone polymer to the fire seal mixture such that the base rubber compound is between 50% and 95% of a total mass of the fire seal mixture;
    adding an additive to the fire seal mixture wherein the additive is a vitreous material that is between 2.5% and 50% of the total mass of the fire seal mixture or an intumescent material that is between 5% and 50% of the total mass of the fire seal mixture;
    adding short fiber strands to the fire seal mixture that are between 1% and 25% of the total mass of the fire seal mixture; and to create a second compound; and
    curing the fire seal mixture into the fire seal.

13. The method of making a fire seal of claim 12, wherein the short fiber strands are selected from the group consisting of short-cut carbon fibers, para-aramid, meta-aramid and basalt.

14. The method of making a fire seal of claim 12, wherein the short fiber strands are short-cut carbon fibers.

15. The method of making a fire seal of claim 12, wherein the additive is the vitreous material.

16. The method of making a fire seal of claim 15, wherein the vitreous material is enamel.

17. The method of making a fire seal of claim 15, wherein the vitreous material is glass.

18. The method of making a fire seal of claim 15, wherein the vitreous material is added to the fire seal mixture as a powder.

19. The method of making a fire seal of claim 12, wherein the short fiber strands have a tensile strength of between 2000 and 5300 MPa.

20. The method of making a fire seal of claim 19, wherein the short fiber strands have a tensile modulus of between 300 and 350 GPa.

21. The method of making a fire seal of claim 12, wherein the short fiber strands have a length between 0.5 mm and 10.0 mm.

22. The method of making a fire seal of claim 12, wherein the additive is an intumescent material that is between 5% and 50% of the total mass of the fire seal mixture.

* * * * *